United States Patent Office 3,001,882
Patented Sept. 26, 1961

3,001,882
THERMAL INSULATING MATERIAL AND
METHOD OF MAKING SAME
William C. Taylor, Toledo, Ohio, assignor, by mesne assignments, to Owens-Corning Fiberglas Corporation, a corporation of Delaware
No Drawing. Filed Dec. 30, 1957, Ser. No. 705,772
17 Claims. (Cl. 106—120)

The present invention relates to a new and improved thermal insulating material and to a method of making such material.

Generally, the present invention proposes improved hydrous calcium silicate insulation media having incorporated therein chemically inert, finely divided additives, and an improved method of manufacturing such media by the incorporation of chemically inert, finely divided additives in a lime-silica-water slurry (which may contain a fibrous suspension ingredient), and curing the slurry with the additives in situ.

Calcium silicate thermal insulating products are well known in the art, for example as disclosed in United States Patents 2,547,127, 2,665,996, and in Reissue Patent 23,228, all owned by the assignee of the present invention. Such products contain crystalline synthetic tobermorite and/or xonotlite, and are prepared by the induration of aqueous lime-silica slurries in which the molar ratio of lime-silica will fall within the range of from 0.65:1 to 1:1, and the water to solids ratio will vary from about 0.75:1 to about 9.0:1. In the preparation of low density, preferred insulating materials, i.e., at densities ranging from about 5 to 15 p.c.f. (pounds per cubic foot), asbestos fibers (preferably chrysotile or amosite or mixtures of the two) are added as a suspension medium and a reinforcing material.

Microscopic inspection of such desirable thermal insulating materials shows that the materials have a lath-like microcrystalline structure (in the case of synthetic xonotlite) or a flat plate microcrystalline structure (in the case of synthetic tobermorite). Such crystals of hydrous calcium silicate will have relatively large areas of inter-crystal contact, and this contact will provide paths of heat flow through the material and will reduce the heat insulating value of the material.

Throughout this disclosure the efficiency of heat insulation of any given material will be expressed in terms of its "K-factor." This "K-factor" is the thermal conductivity in units of B.t.u./hr./ft.$^2$/° F./inch and is a well recognized and accepted term of art. The lower the K-factor, the better the insulating value of a given material. For sake of uniformity, all the K-factors given herein have been determined at a mean temperature of 550° F.

I have found that a remarkable increase in thermal insulating efficiency (i.e., decrease in K-factor) can be obtained by the incorporation into the crystalline matrix of a synthetic calcium-silicate material of a finely divided, chemically inert additive.

The following factors have been determined regarding the product and method of the present invention:

I. The chemical nature of the additive is not significant, so long as the additive is inert to the slurry ingredients and to the final crystalline structure (see Table I).

II. The effectiveness of the additive increases as the additive particle size decreases (see Table II).

III. The effectiveness of the additive increases with increasing additive amounts, but after an optimum amount is present, the presence of additional additive is useless (see Table III).

IV. If the weight of additive and its fineness are maintained constant, lower K-factors result from the use of additives of lower densities (see Table IV).

V. A combination of additives is more effective than an equivalent amount of a single additive (see Table V).

VI. Other than the attainment of the optimum additive amount, the amount of additive is limited only by the structural strength of the resultant product (see Table VI).

So far as the method of this invention is concerned, a slurry having a $CaO/SiO_2$ molar ratio of from 0.65:1 to 1:1 is prepared with a water/solids ratio of from 0.75:1 to 9.0:1; the greater the water/solids ratio, the lower the apparent density of the final product. A sufficient amount of suspending agent may be added to prevent segregation of the solids of the slurry prior to initiation of reaction.

Next, the additive is introduced into the slurry in a predetermined amount relative to the total solids content of the slurry. All percentage compositions given herein are based on total slurry solids. The slurry is agitated as necessary to uniformly disperse the additive therein.

The slurry-additive composition is then introduced into a mold and indurated under pressure (in excess of 125 p.s.i.) and heat (in excess of 173° C.) to react the slurry ingredients into a microcrystalline structure determined by the slurry ingredients and ratios, the additive being indurated in situ and being fully integrated into the microcrystalline formation of the product.

It is, therefore, an important object of this invention to provide an improved hydrous calcium silicate insulation product of improved thermal insulating properties.

Another important object of this invention is the provision of an improved method of making an improved hydrous calcium silicate insulation product by incorporating therein a chemically inert, finely divided additive.

A further object is the provision of a thermal insulation product containing integrated, microcrystalline synthetic calcium silicate having finely divided particles of at least one inert additive distributed throughout the structure.

Yet an additional object is to provide a method of making an insulation product by forming an aqueous slurry of CaO and $SiO_2$, dispersing therein a finely granulated chemically inert additive, and indurating the slurry with the additive in situ.

It is still another important object to provide an insulating product containing a crystalline calcium silicate prepared from an aqueous slurry having a $CaO/SiO_2$ ratio of from 0.65:1 to 1:1 and having therein a minor amount of a particulated inert additive.

METHOD

The method of the present invention involves the manipulative steps of forming the lime-silica-water slurry, the addition of the finely particulated chemically inert additive, the dispersion of the additive in the slurry, the casting of the clurry into a mold of suitable size and form, and reacting the slurry, as by indurating and/or autoclaving.

The specific lime to silica ratio of the slurry depends upon the desired hydrous silicate of the final product. For example, if it is desired that a final synthetic xonotlite ($5CaO.5SiO_2.5H_2O$) be obtained, the slurry is prepared at a lime to silica molar ratio of approximately 1. Also, if desired, the xonotlite product may be converted to synthetic wollastonite ($5CaO.5SiO_2.H_2O$) by heating at atmospheric pressures to temperatures in excess of 760° C. If it is desired that a final synthetic tobermorite ($4CaO.5SiO_2.2H_2O$)

be obtained, then the lime to silica molar ratio in the slurry should be approximately 0.8:1. In either case, the final apparent density of the resultant composition will be dependent upon the water to solids ratio of the slurry. Preferred embodiments of the present invention have a final apparent density from about 10 p.c.f. (lbs. per cubic foot) to about 15 p.c.f. To obtain a nominal apparent density of 10 p.c.f., the water to solids ratio should be 6:1.

After the basic slurry has been prepared, and particularly if a final product of relatively light density is desired, a suspending agent of fibrous form, preferably a fibrous asbestos, such as chrysotile asbestos or amosite asbestos, is added in an amount to prevent segregations of the solids of the slurry for a predetermined time interval prior to initiation of the reaction to the final slurry.

Finally, the desired inert additive is added in a desired amount. The additive percentages set forth herein define the ratio of additive solids to total solids in the final product.

The slurry and additive are agitated, as by stirring, until the additive is uniformly dispersed through the slurry mix.

The slurry and additive are then introduced into a mold of suitable size and shape, and the slurry-additive mixture is reacted to its final crystalline form. The reaction takes place at super-atmospheric pressures and super-atmospheric temperatures by indurating or autoclaving the slurry at a pressure of at least 125 p.s.i. and at a temperature of at least 173° C. Preferably steam autoclaving is utilized to carry out the reaction, the autoclaving extending for an appreciable length of time, on the order of from 2 to 10 hours.

The non-additive-containing controls of the present invention were prepared by following the above outlined procedure, with the exception that no additive was present.

As exemplary of the process, the preparation of the various control compositions will be described, it being understood that a similar process is carried out for the additive-bearing examples herein given.

Controls A, B, and C set forth in the following tables are the essentially synthetic tobermorite and are prepared by mixing the slurry at a lime to silica molar ratio of 0.8:1 by mixing first the lime and hot water and then adding silica. A water to solids ratio of approximtely 6.0:1 was utilized.

To control A was added 20% chrysotile asbestos, and the resultant slurry was indurated for 6½ hours at 225 p.s.i.

For control B, 20% amosite asbestos was added to the slurry, and the resultant mixture was indurated for 6½ hours at 225 p.s.i.

For control C, a mixture of 12% chrysotile and 8% amosite asbestos was added to the slurry and the mixture was indurated for 6½ hours at 225 p.s.i.

Control D has essentially a xonotlite crystalline structure and was prepared by mixing the slurry at a lime to silica molar ratio of approximately 1:1. Initially the lime was mixed with hot water and then quartz was added to give the desired lime to silica ratio. Once again, the water to solids ratio was approximately 6.0:1 so as to yield a nominal final apparent density of 10 p.c.f. 15% chrysotile asbestos was added to the slurry, and the mixture was indurated for 6½ hours at 225 p.s.i.

In the case of the controls, the induration caused the reaction of the slurry to hydrous calcium silicate of the indicated chemical formula, the asbestos fibers being dispersed at random throughout the crystalline matrix.

REPRESENTATIVE ADDITIVES

In Table I there is presented the results of the addition of a number of different additives to the crystalline tobermorite structure of controls A, B, and C. These additives differ widely in their chemical composition and molecular structure. Apparently the chemical nature of te additives is of no importance. The crystalline form of the additives also is of no apparent importance, since carbon black and ground hard coal both substantially reduce the K-factor.

It is essential that the material be chemically inert, both with respect to the slurry ingredients and to the final product. Further, the material must retain its particulated form within the final crystalline structure.

Table I

REPRESENTATIVE ADDITIVES

| Sample No. | Additive | Density | K-Factor |
|---|---|---|---|
| 1 | None, Control A | 10.0 | .685 |
| 2 | 5% MgCO₃ | 9.8 | .630 |
| 3 | 5% Zircon | 10.4 | .640 |
| 4 | 1% Carbon Black | 9.4 | .605 |
| 5 | None, Control B | 10.1 | .626 |
| 6 | 5% MgCO₃ | 10.45 | .573 |
| 7 | 5% BaCO₃ | 10.7 | .601 |
| 8 | 5% BaSO₄ | 11.2 | .595 |
| 9 | 5% CaCO₃ | 10.4 | .557 |
| 10 | 5% Ferrous Silicate | 10.65 | .590 |
| 11 | 5% FeSO₄.7 H₂O | 10.2 | .620 |
| 12 | 5% Gypsum | 11.05 | .599 |
| 13 | 5% Carbon Black | 10.55 | .534 |
| 14 | 4% Chromite (air float) | 10.55 | .585 |
| 15 | None, Control C | 10.4 | .635 |
| 16 | 5% Hard Coal | 10.45 | .551 |
| 17 | 10% Natural Wollastonite | 8.86 | .541 |
| 18 | 10% Finely Ground Dolomite | 9.5 | .571 |

THE EFFECT OF ADDITIVE PARTICLE SIZE

In the case of those slurries containing additives, the additive is necessarily chemically inert and is finely divided so as to be uniformly dispersed through the slurry and so as to enter the interstices of the final crystalline structure. Apparently, the finely divided additive is interposed between adjacent crystals and separates the crystals from one another so as to interrupt any normal path of heat flow through the adjacent crystals.

It has been found that the particle size of the additive can be correlated to its effectiveness in reducing the K-factor. This is not surprising, if the reduction in K-factor is due to the separation of the crystals of the matrix by the additive particles. Excellent results can be obtained by the use of particles having a maximum size which will pass a 200-mesh screen. This corresponds to an individual or average particle size of approximately 74 microns. To obtain optimum results, it is preferred that the particles be of a size to pass a 325-mesh screen, which corresponds to a particle size of 44 microns. Several commercially available materials are defined as to size by commercial usage, such as "water-floated" dolomite or "air-floated" iron chromite. These materials have particle sizes substantially smaller than those above defined. The carbon black herein utilized can be "colloidal" lamp black which, of course, has a particle size far below those ranges hereinbefore set forth but which still has a definite particulated or granulated structure.

All of the examples given in the tables herein set forth are of a size finer than 200-mesh, unless otherwise noted. It will be seen from Table II that the effect of particle size is very pronounced. Grain size greater than 200 mesh may actually have a deleterious effect, whereas sizes smaller than this become increasingly beneficial as the size decreases.

*Table II*

EFFECT OF PARTICLE SIZE

| Sample No. | Additive | Particle Size | K-Factor |
|---|---|---|---|
| 1 | None, Control B | | .626 |
| 2 | 5% dolomite | 90%—200 mesh | .591 |
| 3 | ---do--- | 100%—325 mesh | .575 |
| 4 | ---do--- | water-floated | .571 |
| 5 | 10% limestone | 70%—200 mesh | .561 |
| 6 | ---do--- | 80%—200 mesh | .557 |
| 7 | ---do--- | 90%—200 mesh | .550 |
| 8 | ---do--- | 100%—325 mesh | .547 |
| 9 | None, Control C | | .635 |
| 10 | 10% dolomite | −50 +100 mesh | .641 |
| 11 | ---do--- | −100 +200 mesh | .640 |
| 12 | ---do--- | −200 +325 mesh | .609 |
| 13 | ---do--- | −325 mesh | .589 |
| 14 | ---do--- | −325 mesh reground | .571 |

THE EFFECT OF ADDITIVE AMOUNT

Since this type of insulating material depends primarily for its insulating value upon the occurrence of dead air spaces intermediate the crystals, it is apparent that the presence of the additive subdivides the crystalline matrix so as to provide additional dead air spaces. The K-factor of dead air at 550° F. is 0.312. This represents the ultimate K-factor that can be approached but never attained in light-weight thermal insulations, such as those proposed herein. If the additive were present in an amount sufficient to form a complete additive layer or phase filling the crystalline interstices, then the insulation would have a K-factor which is that of the additive, and heat flow would occur through the additive itself. This formation of a substantially continuous additive phase is the probable explanation for the occurrence of optimum additive amounts and for the prevention of further insulation improvement upon the addition of extra additive after this optimum amount has been attained.

It has been found by experimental results summarized in Table III that the reduction in K-factor can be related to the amount of additive up to an optimum additive amount, but that the addition of additive above the optimum amount effects no substantial reduction in K-factor. For example, in Table III it will be seen that no substantial decrease in K-factor occurs upon the addition of precipitated calcium carbonate in excess of 4%, that 10% of ground limestone was fully as effective as 15%, and that 15% of iron chromite gave no reduction in K-factor over that reduction obtained upon the addition of only 10%. Generally, the preferred amounts range from 5% to 25%.

*Table III*

EFFECT OF AMOUNT OF ADDITIVE

| Sample No. | Additive | Amount, percent | K-Factor |
|---|---|---|---|
| 1 | None, Control B | | .626 |
| 2 | $CaCO_3$ | 2 | .600 |
| 3 | $CaCO_3$ | 4 | .565 |
| 4 | $CaCO_3$ | 5 | .557 |
| 5 | $CaCO_3$ | 8 | .567 |
| 6 | $CaCO_3$ | 10 | .565 |
| 7 | Limestone | 10 | .550 |
| 8 | ---do--- | 15 | .550 |
| 9 | Iron Chromite | 2 | .600 |
| 10 | ---do--- | 4 | .585 |
| 11 | ---do--- | 10 | .542 |
| 12 | ---do--- | 15 | .542 |

THE EFFECT OF DENSITY OF ADDITIVE

The effect of additive density upon the degree of lowering of the K-factor has been studied primarily to determine whether the theory of the present invention is proper, that is to determine whether the K-factor is lowered by increasing the number of interfering surfaces to heat flow through the crystalline structure. If this theory is true, for a given percentage addition of additive materials of about the same particle size, a greater number of inter-faces would be introduced with a lower density material. Table IV sets forth the results obtained by the addition of additives of about the same fineness. It will be observed that the K-factor is decreased by the addition of additives of lower density, although an appreciable reduction was obtained even where the highest density material, specifically, iron chromite, was added.

Although the difference in K-factor in accordance with density is of rather low degree, these results are interesting primarily for their aid in proving the correctness of the theory.

*Table IV*

EFFECT OF DENSITY OF ADDITIVE

| Sample No. | Additive | Additive Density | K-Factor |
|---|---|---|---|
| 1 | None, Control B | | .626 |
| 2 | 5% Graphite (microfyne) | 2.25 | .534 |
| 3 | 5% $CaCO_3$ | 2.7 | .557 |
| 4 | 5% Dolomite | 2.9 | .575 |
| 5 | 5% $MgCO_3$ | 3.0 | .573 |
| 6 | 5% Mineral $FeCO_3$ | 3.8 | .570 |
| 7 | 5% $BaCO_3$ | 4.4 | .585 |
| 8 | 5% $BaSO_4$ | 4.5 | .595 |
| 9 | 4% Iron Chromite | 4.6 | .585 |

THE EFFECT OF MULTIPLE ADDITIVES

As previously explained in connection with Table III, an optimum amount of additive appears to exist, beyond which amount further additions do not materially affect the K-factor.

It also has been found that the K-factor may be further reduced by the introduction of a combination of two or more materials as an additive. The introduction of multiple additives, even in the same total amounts as a single additive, has been found to be highly advantageous.

The explanation of the increased effectiveness of the addition of two or more additives probably resides in the fact that such additives normally are of slightly different granular size plus the fact that a maximum amount of a plurality of additives would still form a discontinuous phase of any single additive and heat transfer between the dissimilar materials would be less than through a single, integrated, uniform phase such as would be formed by the same amount of a single additive.

So far as the combinations of additives are concerned, there appears to be no particularly required correlation between the multiple additives used at any one time. Further, there appears to be no necessary correlation between the particle sizes of the multiple additives. However, it will be observed from Table V that the addition of multiple additives invariably gives improved thermal insulating characteristics, as measured by the decrease in K-factor, over the use of a single additive alone.

Table V
EFFECT OF MULTIPLE ADDITIVES

| Sample No. | 1st Additive | 2nd Additive | 3rd Additive | Density | K-Factor |
|---|---|---|---|---|---|
| 1 | None, Control B | | | 10.1 | .626 |
| 2 | 10% Limestone | | | 10.45 | .555 |
| 3 | do | 1% Carbon Black | | 10.75 | .530 |
| 4 | do | 5% Iron Chromite | | 11.2 | .530 |
| 5 | do | 10% Iron Chromite | | 11.9 | .534 |
| 6 | 20% Limestone | | | 10.45 | .550 |
| 7 | do | 1% Carbon Black | | 10.9 | .505 |
| 8 | do | 5% Iron Chromite | | 10.8 | .509 |
| 9 | 10% Iron Chromite | | | 10.8 | .542 |
| 10 | do | 1% Graphite (microfyne). | | 10.6 | .528 |
| 11 | 15% Iron Chromite | | | 9.9 | .542 |
| 12 | do | 1% Carbon Black | | 11.1 | .517 |
| 13 | do | 5% Limestone | | 10.85 | .516 |
| 14 | None, Control C | | | 10.4 | .635 |
| 15 | 11% Limestone | 4% Iron Chromite | | 11.55 | .550 |
| 16 | do | do | 1% Graphite | 10.4 | .538 |
| 17 | do | do | 2% Graphite | 10.15 | .533 |
| 18 | 5% Limestone | 5% Iron Chromite | 5% hard coal | 10.05 | .520 |
| 19 | {6% Limestone / 3% Wollastonite} | 2% Iron Ore | 2% hard coal | 11.05 | .502 |
| 20 | 5% Limestone | 1% Iron Ore | | 10.75 | .574 |
| 21 | do | 2% Iron Ore | | 10.75 | .61 |
| 22 | 7% Limestone | 3% Iron Ore | | 10.8 | .568 |
| 23 | 11% Limestone | 4% Iron Ore | | 10.2 | .567 |
| 24 | 15% Limestone | 5% Iron Ore | | 10.5 | .560 |
| 25 | do | do | 1% CaCO$_3$ | 10.6 | .545 |
| 26 | 20% Limestone | do | | 11.2 | .542 |
| 27 | None, Control D | | | 12.8 | .644 |
| 28 | 10% Limestone | | | 12.85 | .614 |
| 29 | 5% Limestone | 5% Iron Chromite | | 11.45 | .606 |
| 30 | do | 15% Iron Chromite | | 11.9 | .575 |

THE EFFECT OF ADDITIVE TO LATTICE RATIO

In Table VI the effect of additive to lattice ratio is presented. In this case, the percentage of lattice ingredients (as a percentage of total solids) was decreased from 80% to 20%, while the total additive content was increased from zero to 60%. A constant asbestos content was maintained. This Table VI indicates, and other tests have borne out, the fact that the only actual limitation upon the total additive content of the crystalline structure is the desired and necessary physical structure of the resultant insulating material. As a practical matter, and in applicant's commercial utilization of this invention, it is preferred that the additive content be limited to 25% or less of the total solids in the finished product. In fact, applicant's preferred commercial embodiment of the invention utilizes a total additive content of about 15%.

Table VI
EFFECT OF ADDITIVE/LATTICE RATIO

| Sample No. | Percent Lattice Ingredients | Percent Asbestos | Total Additive Content (80% Limestone, 20% Iron Ore), percent | K-Factor |
|---|---|---|---|---|
| 1 (Control B) | 80 | 20 | 0 | .626 |
| 2 | 60 | 20 | 20 | .529 |
| 3 | 50 | 20 | 30 | .515 |
| 4 | 40 | 20 | 40 | .485 |
| 5 | 30 | 20 | 50 | .518 |
| 6 | 20 | 20 | 60 | (too weak to handle). |

SUMMARY

The present invention thus proposes the modification of a hydrous calcium silicate thermal insulation medium by the incorporation therein of a chemically inert, finely divided additive.

Inasmuch as the effectiveness of the thermal insulation of the hydrous calcium silicate type is determined by the heat conducting ability of the crystalline matrix and by the entrapment of dead air within the crystalline structure, it is apparent that any additive which can enter the crystalline matrix to separate the crystals from one another, so as to maintain them from heat conductive contact, and to further subdivide the matrix into additional dead air spaces, will be effective in increase the thermal insulating value or to decrease the K-factor.

In order to insure formation of the desired crystalline insulating material, the additive must be chemically inert and in order to enter the crystalline matrix in the desired fashion, the additive must be finely divided. Desired particle sizes are not greater than 74 microns (200-mesh) and preferably particle sizes are less than 44 microns (325-mesh).

The amount of additive is limited only by the structure desired in the final product. Preferably the amount of additive is restricted to less than 25%, although as much as 50% may be incorporated within the matrix.

The use of multiple additives has been found to be particularly useful and to effect a peculiarly effective depression of the K-factor. Such multiple additives are preferably used in amounts ranging from 5% to 25% by weight of total solids.

When all of the various factors are considered, including the effectiveness in depressing the K-factor, commercial availability of the desired particle sizes, a plentiful and inexpensive supply in commercial channels, and inertness to the slurry ingredients and to the final structure, the following additives are preferred: Carbon black, zircon, limestone, hard coal, iron ore, iron chromite, and mineral wollastonite. Such preferred materials also may be defined as chemically inert, finely particulated materials selected from the group consisting of inorganic metal salts, metal ores, elemental carbon, solid carbonaceous materials, and mixtures thereof.

While preferred embodiments have been described above in detail, it will be understood that numerous modifications might be resorted to without departing from the scope of the invention as defined in the following claims.

What I claim is:

1. A thermal insulating product consisting essentially of a synthetic crystalline hydrous calcium silicate formed as the reaction product of a lime-silica slurry and having asbestos fibers distributed therein and a minor amount of particles chemically inert to the slurry, the additive being dispersed throughout and interposed in the calcium silicate matrix, said particles being of a size not greater than 74 microns.

2. An insulating product consisting essentially of the reaction product of a lime-silica slurry, the lime-silica molar ratio of which is from 0.6:1 to 1:1, said reaction product having dispersed therein a finely particulated additive which is chemically inert to the slurry and to the final product and which has a particle size not greater than 74 microns.

3. In a method of making an insulating product prepared from an aqueous lime-silica slurry having a lime to silica molar ratio within the range of from 0.6:1 to 1:1 and a water to solids ratio of from 0.75:1 to 5:1, the steps of dispersing in said slurry a finely particulated additive which is chemically inert to the slurry, and indurating the slurry with the additive in situ to form a crystalline hydrous calcium silicate product, at least some of the crystals of which are separated by particles of said additive having a particle size not bigger than 74 microns.

4. In a method of making an insulating product, the steps of preparing an aqueous lime-silica slurry having a lime to silica molar ratio within the range of from 0.6:1 to 1:1 and a water to solids ratio of from 0.75:1 to 5:1, dispersing in said slurry an additive having a particle size less than 74 microns and which is chemically inert to the slurry, and indurating the the slurry with the additive in situ.

5. A thermal insulating product consisting essentially of an integrated synthetic crystalline hydrous calcium silicate body selected from the group consisting of tobermorite, xonotlite, and mixtures thereof, said body being formed as the reaction product of a lime-silica slurry, and from 5% to 25% by weight of total solids content of at least one inert additive dispersed throughout the calcium silicate matrix, said additive consisting of particles of a size not to exceed 44 microns and being chemically inert to the slurry.

6. A thermal insulating product consisting essentially of a synthetic crystalline hydrous calcium silicate having not more than 20% by weight asbestos fibers distributed therein, said product being the reaction product of a lime-silica slurry, and from 5% to 25% by weight of a mixture of limestone, and at least one other form of additive particles dispersed throughout the calcium silicate matrix, said limestone and other additive particles being of a size not greater than 74 microns and being chemically inert to the slurry.

7. A thermal insulating product consisting essentially of a synthetic crystalline hydrous calcium silicate having not more than 20% by weight asbestos fibers distributed therein, said product being the reaction product of a lime-silica slurry, and from 5% to 25% by weight of a mixture of coal and at least one other form of additive particles dispersed throughout the calcium silicate matrix, said coal and other additive particles being of a size not greater than 74 microns and being chemically inert to the slurry.

8. A thermal insulating product consisting essentially of crystalline hydrous calcium silicate having not more than 20% by weight asbestos fibers distributed therein, said product being the reaction product of a lime-silica slurry, and from 5% to 25% by weight of zircon and at least one other form of additive particles dispersed throughout the calcium silicate matrix, said zircon and other additive particles being of a size not greater than 74 microns and being chemically inert to the slurry.

9. A thermal insulating product consisting essentially of synthetic crystalline hydrous calcium silicate having not more than 20% by weight asbestos fibers distributed therein, said product being the reaction product of a lime-silica slurry, and from 5% to 25% by weight of iron ore and at least one other form of additive particles dispersed throughout the calcium silicate matrix, said iron ore and other additive particles being of a size not greater than 74 microns and being chemically inert to the slurry.

10. A thermal insulating product consisting essentially of synthetic crystalline hydrous calcium silicate having not more than 20% by weight asbestos fibers distributed therein, said product being the reaction product of a lime-silica slurry, and from 5% to 25% by weight of a mixture of limestone, iron ore, coal, and wollastonite particles dispersed throughout the calcium silicate matrix, said particles being of a size not greater than 74 microns and being chemically inert to the slurry.

11. An insulating product consisting essentially of the reaction and induration product of a lime-silica slurry the lime-silica molar ratio of which is from 0.6:1 to 1:1, said reaction product having dispersed therein from 5% to 25% by weight of a finely particulated additive which is chemically inert to the slurry and to the final product and which has a particle size not greater than 44 microns.

12. In a method of making a hydrous calcium silicate insulating product selected from the group consisting of tobermorite, xonotlite, and mixtures thereof, from an aqueous slurry, the steps of dispersing in said slurry at least one finely particulated additive which is chemically inert to the slurry and which has a particle size not greater than 74 microns, and indurating the slurry with the additive in situ to form a crystalline hydrous calcium silicate product, at least some of the crystals of which are separated by particles of said additive.

13. The method of claim 12, wherein said at least one additive includes limestone and is present in an amount equivalent to from 5% to 25% of the total slurry solids content.

14. The method of claim 12, wherein said at least one additive includes coal and is present in an amount equivalent to from 5% to 25% of the total slurry solids content.

15. The method of claim 12, wherein said at least one additive includes zircon and is present in an amount equivalent to from 5% to 25% of the total slurry solids content.

16. The method of claim 12, wherein said at least one additive includes iron ore and is present in an amount equivalent to from 5% to 25% of the total slurry solids content.

17. The method of claim 12, wherein said at least one additive consists essentially of a mixture of limestone, iron ore, coal, and wollastonite, and the mixture is present in an amount equivalent to from 5% to 25% of the total slurry solids content.

References Cited in the file of this patent

UNITED STATES PATENTS

| | | |
|---|---|---|
| 4,333 | Singleton | Dec. 26, 1845 |
| 770,083 | May | Sept. 13, 1904 |
| 1,569,755 | Irvin | Jan. 12, 1926 |
| 2,456,643 | Napier | Dec. 21, 1948 |
| 2,554,934 | Ayers | May 29, 1951 |
| 2,565,340 | Anderson | Aug. 21, 1951 |
| 2,586,726 | Schuetz et al. | Feb. 19, 1952 |
| 2,602,754 | Abraham | July 8, 1952 |
| 2,698,251 | Shea | Dec. 28, 1954 |
| 2,787,345 | Soubier et al. | Apr. 2, 1957 |
| 2,944,911 | Muller et al. | July 12, 1960 |

FOREIGN PATENTS

| | | |
|---|---|---|
| 20,432 of 1896 | Great Britain | Dec. 12, 1896 |
| 497,125 | Great Britain | Dec. 13, 1938 |